FREQUENCY DIVIDER FOR VIDEO SYSTEMS EMPLOYING BLOCKING OSCILLATOR UTILIZING REVERSE BREAKDOWN DIODE IN FEEDBACK CIRCUIT

Filed May 9, 1961

INVENTORS: J. GREENBURG
L. A. MEACHAM
D. H. NASH
L. SCHENKER

BY Charles Scott Phelan
ATTORNEY

United States Patent Office 3,144,581

Patented Aug. 11, 1964

3,144,581

FREQUENCY DIVIDER FOR VIDEO SYSTEMS EMPLOYING BLOCKING OSCILLATOR UTILIZING REVERSE BREAKDOWN DIODE IN FEEDBACK CIRCUIT

Joel Greenburg, Plainfield, Larned A. Meacham, New Providence, and Donald H. Nash and Leo Schenker, Berkeley Heights, N.J., assignors to Bell Telephone Laboratories, Incorporated, New York, N.Y., a corporation of New York Filed May 9, 1961, Ser. No. 108,876
10 Claims. (Cl. 315—27)

This invention relates to a sweep voltage generator for video systems and the like. The invention is particularly directed to such a generator which includes a saw-tooth, frequency-dividing oscillator for use in a videotelephone transmitter to provide sweep signals for controlling a beam of electrons at the field frequency of the video presentation in synchronism with oscillations occurring at the line frequency of the video presentation.

An increasing amount of work is being done in the area of videotelephones to enable telephone subscribers to communicate with one another from their respective locations by video as well as audio means. Many of the videotelephone concepts are similar to those found in the conventional television field, as one might expect. It is necessary, however, in videotelephone installations to provide at each subscriber station complete video and audio transmission and reception facilities. Such facilities must include equipment for generating the usual signals to control the sweep of an electron beam across the screen of a cathode ray device line-by-line in repetitive fields for either scanning or display purposes. Of course, videotelephone equipment must be relatively small and inexpensive in order to be an attractive commercial item for home or office installation. In addition, the picture processing and sweep control equipment must be sufficiently flexible to operate within the manufacturing tolerances required for the large numbers of receivers with which it may be associated from time to time. Also, the sweep control equipment, including sweep synchronizing signal generating circuits, must produce a highly stable picture.

The picture stability requirement places stringent restrictions on synchronizing signals. These restrictions are particularly severe for an interlaced scanning system because each scanning line traced by the controlled electron beam for each field scanned must lie exactly midway between a pair of lines traced in the previous field. Any slight voltage instability in the sweep control signals can cause a loss of interlace resolution when picture lines jitter, i.e., move periodically or randomly, in and out of their proper interlaced spacing relationship. It is for this reason that one of the basic essentials in most video signal transmitters for interlaced scanning systems is elaborate apparatus for first producing recurrent signals at the picture line frequency and then counting down to produce further recurrent signals at the field frequency. However, when this count-down equipment is simplified to reduce its size and cost, there is a tendency for the simplified equipment to lack the necessary stability and also a tendency for it to be excessively sensitive to various system disturbances, such as noise and circuit element aging.

It is, therefore, one object of the invention to simplify the generation of field synchronizing signals in video systems with no loss of phase stability.

Another object is to improve videotelephone transmitter sweep circuits.

A further object is to stabilize a triggered oscillator circuit so that it may be employed as a single-stage count-down circuit for producing video field frequency signals in response to line frequency signals.

These and other objects of the invention are realized in an illustrative television system suitable for videotelephone usage in which horizontal, or line, frequency synchronizing signal oscillations are applied to the base electrode of a transistor blocking oscillator. This oscillator is employed both for dividing down the line frequency to the vertical, or field, frequency, and for generating the vertical sweep voltage wave. A capacitor arranged in the blocking oscillator output circuit is charged from a constant current source and intermittently discharged through the oscillator transistor at the desired field frequency to produce the field sweep signal. A regenerative feedback transformer in the blocking oscillator has two reverse breakdown diodes connected to its secondary winding in such a way as to establish, respectively, a fixed reference voltage level for use in controlled triggering of the discharge action and another precisely constant voltage with respect to ground at which each cycle of oscillator action is terminated.

It is one feature of the invention that a single-stage, frequency-dividing oscillator responds to picture line frequency oscillations to produce picture field frequency oscillations which control a display of interlaced picture fields that is stable in both resolution and position.

Another feature is that reverse breakdown diodes within the oscillator circuit terminate each cycle of oscillation so that the oscillator output voltage has one excursion thereof fixed at a predetermined voltage with respect to ground.

An additional feature is that saturation is avoided in both the transistor and the transformer of the oscillator.

The oscillator circuit of the invention is further characterized in that it exhibits "beneficial memory" which impels it to continue operating at a currently established frequency division ratio instead of tending to change back and forth, either irregularly or periodically, between two division ratios, as do ordinary frequency-dividing oscillatory circuits when operating at numerically large division ratios. This improved behavior is particularly useful in a system, such as a videotelephone system, in which the exact value of the division ratio, as between line and field frequencies, is unimportant. In such a system the ratio of higher to lower frequency is required to be a number that has approximately a prescribed value and that remains fixed at any one value except for infrequent changes to a neighboring ratio.

A full comprehension of the various objects, features, and advantages of the invention may be obtained from a consideration of the following detailed description when taken together with the appended claims and the attached drawings in which:

Figure 1:
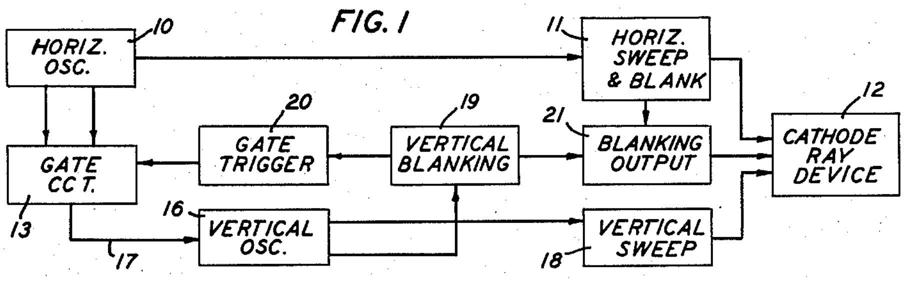
FIG. 1 is a simplified block and line diagram of a synchronizing signal generating system in accordance with the invention.

In FIG. 1 the output of a horizontal oscillator 10 may have a square or trapezoidal waveform. The output wave is applied to suitable horizontal sweep and blanking circuits 11 which are coupled to a cathode ray device 12, such as a television camera. Two different polarities, and hence different phases, of the output of oscillator 10 are also alternately applied through a gate circuit 13 to a vertical oscillator 16 in the manner described in detail in an application of L. A. Meacham, Serial No. 34,263, filed June 6, 1960. Vertical oscillator 16 receives at any given time one phase or the other of the oscillator 10 output at the picture line frequency from gate circuit 13 on lead 17. Oscillations at the field frequency and having a saw-tooth waveform suitable for sweep purposes appear at the output of oscillator 16 and are coupled to suitable vertical sweep amplifying circuits 18 which, in turn, apply the necessary vertical deflection signals to cathode ray device 12. Another output of oscillator 16 is applied to a vertical blanking circuit 19 from which one output is taken through a gate trigger circuit 20 back to the gate circuit 13 for operating the latter circuit to couple the two phases of the horizontal oscillations alternately from oscillator 10 to oscillator 16. A blanking output circuit 21 combines the vertical blanking signals from circuit 19 with the horizontal blanking signals from circuit 11 and applies them to device 12.

As described in the mentioned Meacham application, the use of alternate phases of the horizontal oscillations results in the triggering of oscillator 16 after an odd number of half-periods of the horizontal oscillations. This causes the first lines of alternate scanning fields on cathode ray device 12 to start at one side of the picture field and at a point midway between the sides of the picture field.

In the usual television transmitter, the requisite basic functions provided by vertical oscillator 16, aided by the gate trigger 20 and the gate circuit 13, are commonly performed by the combination of a frequency doubler, four stages of frequency-dividing circuitry, and a sweep waveform generator. That is to say, the generation of a field-frequency sweep waveform, properly synchronized with the line-frequency sweep waveform to produce precisely stable two-to-one interlace, has heretofore been a process involving relatively large amounts of apparatus. In accordance with the present invention, however, the required apparatus is substantially reduced by combining the triggered single-stage oscillator of FIG. 2 in the system with gate circuit 13 and gate trigger 20.

Figure 2:
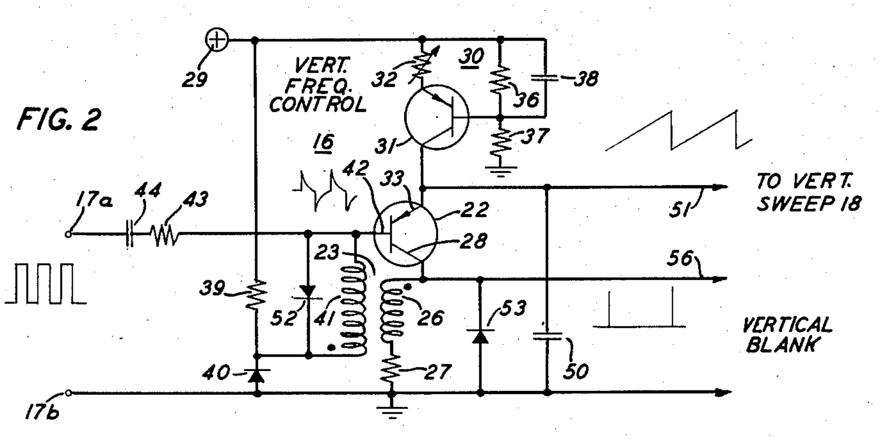
FIG. 2 is a schematic diagram of a blocking oscillator for providing single-stage, line-to-field-frequency count-down in the system of FIG. 1.

The active element of the oscillator 16 in FIG. 2 is a transistor 22. A PNP transistor is shown in FIG. 2, but other types could also be employed with well-known circuit modifications. A transformer 23 regeneratively couples the collector circuit of transistor 22 back to the base circuit thereof. The primary winding 26 of transformer 23 is connected in series with a resistor 27 between ground and the collector electrode 28 of transistor 22.

A grounded source of operating current, schematically represented by a plus terminal 29, supplies current to the oscillator 16 through a constant current circuit 30. The latter circuit includes a transistor 31 with its collector-emitter circuit arranged in series with an adjustable resistor 32 between terminal 29 and the emitter electrode 33 of transistor 22. Resistors 36 and 37 connected between terminal 29 and ground comprise a potential divider for establishing a suitable base bias voltage for transistor 31, and a bypass capacitor 38 shunts resistor 36 to minimize possible rapid variations in the conduction level of transistor 31. Resistor 32 may be adjusted to control the frequency of vertical oscillations in the output of oscillator 16.

Another resistor 39 and a reverse breakdown diode 40 are connected in series between ground and terminal 29. A secondary winding 41 of transformer 23 is connected between a base electrode 42 of transistor 22 and the common junction of resistor 39 and diode 40. These connections establish at the base electrode 42 a fixed bias potential upon which is superimposed any voltage induced in the secondary of transformer 23 during the conduction portion of each cycle of oscillation. This fixed bias is of such magnitude that it normally biases transistor 22 nonconducting in the absence of other suitable input signals.

Diode 40 is poled for forward conduction from ground toward terminal 29 and is of a type well known in the art which conducts in the reverse direction in response to the application of a reverse voltage in excess of a predetermined level. Such a diode, in its reverse conducting condition, can accommodate variable amounts of current without appreciable change in the voltage between its terminals.

Input signals at the line frequency of the picture scanning system are applied from the line 17, shown in FIG. 1, to input terminals 17a and 17b in FIG. 2. These signals comprise a succession of equally spaced positive and negative wave-fronts which are shown as rectangular pulses in FIG. 2. Terminal 17b is connected to ground and terminal 17a is connected by a resistor 43 and a blocking capacitor 44 to base electrode 42. The resistance of resistor 43 is selected to have a value which enables resistor 43 to co-operate with secondary winding 41 for differentiating the input signals prior to their application to base electrode 42. The differentiated input signals are of insufficient magnitude by themselves to trigger oscillator 16. They are, however, superimposed upon the bias established by resistor 39 and diode 40; and ultimately these signals contribute to an over-all biasing influence to trigger the oscillator as will be described.

The described arrangement for differentiating input signals, plus the reversal in polarity of the input signals at terminal 17a when the phases of the horizontal signals alternate, co-operate to cause oscillator 16 to be triggered approximately one-half of a horizontal line interval earlier than would otherwise be the case. Such action results in triggering after an odd number of horizontal half-periods and thereby produces interlace of successive fields if sweep start voltages are properly controlled.

A capacitor 50 is connected between emitter electrode 33 and ground to be charged from constant current circuit 30 when transistor 22 is nonconducting. The charging of capacitor 50 produces an increasing voltage between ground and the output lead 51 which is the trace portion of the vertical sweep oscillations, and this signal is applied to the vertical sweep amplifier circuit 18, shown in FIG. 1. It may be noted that although the trace portion of the sweep is graphically represented in the waveform adjacent to lead 51 as moving upward, the usual action in device 12 is to sweep the trace from the top of the picture downward as the sweep voltage increases.

As capacitor 50 charges, the voltage between its terminals builds up and raises the voltage at emitter electrode 33. The latter voltage presently reaches a level at which a negative-going spike of a differentiated input pulse, superimposed on the bias provided by resistor 39 and diode 40, can reduce the voltage with respect to ground at base electrode 42 sufficiently to cause transistor 22 to conduct. Conduction in the collector electrode 28 causes a regenerative feedback signal to be coupled through transformer 23 to bias base electrode 42 for still greater conduction. As a result, capacitor 50 is rapidly discharged.

A second reverse breakdown diode 52 is connected between the terminals of secondary winding 41 and so poled with respect to base electrode 42 that it limits the maximum potential which can be developed across winding 41 during the regenerative buildup of conduction in transistor 22. Thus, diode 52, when it has been biased into reverse conduction by the regenerative feedback voltage, suddenly prevents any further increase in the voltage developed across winding 41 and thereby stops the increase in collector current through transistor 22. This increase-stopping action is similar to the action produced by transformer saturation. The consequent collapse of the magnetic field around the transformer causes conduction in transistor 22 to be regeneratively turned off, as is well known in the art; and the discharge of capacitor 50 is stopped. During the conduction interval of transistor 22, capacitor 50 is discharged through the transistor emitter-collector circuit and through primary winding 26, resistor 27, and a third reverse breakdown diode 53. In television applications, the rate of this discharge is made to be much greater than the rate at which the charging circuit charges capacitor 50 so that the retrace time of the vertical sweep wave will be relatively short compared to the trace time. Resistor 27 is selected to obtain the desired amount of fed-back base current, and hence the desired conductivity of transistor 22 during the discharge.

Diode 53 is connected between collector electrode 28 and ground, and it conducts most of the collector current during the discharge of capacitor 50. Diode 53 simultaneously limits the peak amplitude of positive pulses which are coupled by a lead 56 from collector electrode 28 to the vertical blanking circuit 19. The limiting action of diode 53 prevents transistor 22 from attaining saturated conduction and thus assures that diodes 40 and 52 retain control of oscillator cycle termination.

It is advantageous for video applications in the present state of the art to select a reverse breakdown voltage for diode 52 such that each oscillation cycle of oscillator 16 is blocked before other circuit influences can secure control. Such an influence might be saturation either in transistor 22 or in transformer 23. In this way, the cycle termination voltage with respect to ground and, therefore, the cycle starting voltage for the oscillator can be precisely controlled by diodes 40 and 52.

However, in oscillators which are dependent upon a saturation condition for producing the oscillator blocking effect, the cycle voltages are not readily controllable because the cycle voltages are functions of the time required to reach saturation. In a transistor or a transformer the time required to reach saturation is dependent upon many factors such as temperatures and materials involved. Variations in the relationships of such factors can take place readily and produce significant changes in the magnitude with respect to ground of the voltages defining transition points in the oscillator cycle. The practical effects of this difference between substantially fixed and variable cycle terminating voltages will be subsequently described.

It can be seen from the foregoing description of FIG. 2 that the reverse breakdown voltage of diode 40 is one of the principal factors affecting the turn-on voltage level for transistor 22. When the voltage across capacitor 50 attains a value which is equal to the reverse breakdown voltage of diode 40, less the reduction in voltage at base electrode 42 due to an impulse from a horizontal input signal spike, transistor 22 is biased into conduction and the trace interval of the sweep wave is terminated. In like manner the retrace interval of the vertical sweep wave must always be terminated at a voltage which is substantially equal to the difference between the reverse breakdown voltage of diode 40, $V_{D40}$, and of diode 52, $V_{D52}$, since these two diodes are connected in series between ground and base electrode 42 with oppositely directed reverse conduction polarities. The diodes 40 and 52 thus provide a highly reliable means for fixing the absolute value of the voltage with respect to ground at which the retrace interval is terminated, and for simultaneously fixing the voltage at which the trace interval begins.

The action which fixes the floor, or starting, voltage for sweep tracing also provides the sweep system of the invention with another highly desirable characteristic which is herein designated "beneficial memory." This characteristic causes oscillator 16 to hold a currently established frequency division ratio $p$ without jitter.

Figure 3:
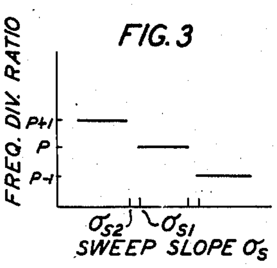

FIG. 3 illustrates graphically the frequency division situation which prevails in single-stage blocking oscillators of the prior art when they are operating at numerically large frequency division ratios. FIG. 3 is a plot of frequency division ratios against trace slope $\sigma_s$ of the vertical sweep wave. This display comprises a succession of steps which fall as the sweep slope increases. It may be noted that with increasing sweep slope the frequency of the blocking oscillator also tends to increase, giving lower ratios. The vertical spacing between steps in the figure represents a frequency change of roughly 0.4 cycle per second in the vertical blocking oscillator frequency in a system with a horizontal line frequency of about 8,200 cycles per second and a blocking oscillator frequency of about 60 cycles per second. In a television system employing a prior art single-stage frequency-dividing circuit to give a vertical frequency of about 60 cycles per second, changes in vertical frequency of more than one cycle per second were experienced under the influence of normal changes in room temperature. Thus, shifts in temperature can cause significant changes in the frequency division ratio.

It will be noted in FIG. 3 that the limits of the steps are slightly spaced with respect to one another. $\sigma_{s1}$ is the minimum slope for operation at the ratio $p$; $\sigma_{s2}$ is the maximum slope for operation at the ratio $p+1$; and $\sigma_{s2}$ is less than $\sigma_{s1}$. The spaces between steps represent regions of transition between steps in which it has been found that prior art oscillators exhibit instability in the frequency division ratio. That is, their division ratio jitters back and forth between two values and produces picture effects which are annoying to the viewer.

Figure 4:
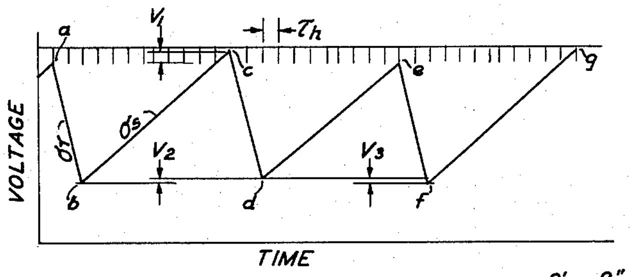
FIGS. 3 through 6 are diagrams illustrating certain operating features of the invention as compared to the prior art.

FIG. 4 illustrates one way in which the above effects may be produced. A composite wave diagram is shown which includes negative-going synchronizing pulses such as those employed to drive oscillator 16. Also shown is the output sweep wave of a typical prior art blocking-oscillator, frequency-dividing circuit. It must be understood that the circuit under consideration in FIG. 4 is one with a frequency division ratio well over 100 to one, but in the diagram of FIG. 4 the number of line synchronizing pulses per cycle of the sweep wave has been reduced to about 12 to one in order to facilitate a demonstration of the circuit function in a drawing of reasonable size.

The end of a first sweep interval occurs when the trace part of the wave hits the tip of a synchronizing pulse at point $a$ in FIG. 4. From this point the sweep wave retraces with a negative slope $\sigma_r$ to a point $b$, at which time one oscillation cycle terminates and the next one begins. It is assumed that the interval between horizontal pulses is such that in the next cycle the wave traces from point $b$ to point $c$ and misses the eleventh synchronizing pulse. This trace portion subsequently strikes the twelfth synchronizing pulse at a voltage level which is higher than the voltage level of point $a$ by an amount $V_1$. The voltage $V_1$ corresponds to the product of the trace slope $\sigma_s$ and the horizontal line interval $\tau_h$.

From point $c$ the wave retraces to a point $d$, which is at a voltage higher than the voltage of point $b$ by an amount $V_2$. In some prior art circuits $V_2$ and $V_1$ may be equal, but more commonly $V_2$ will be smaller than $V_1$ as a result of a combination of effects. One of these effects may be understood by considering the circuit of FIG. 2 as though the diodes 52 and 53 were not included. Capacitor 50 charges to a larger voltage at point $c$ than it did at point $a$, because the sweep cycle lasted for an extra horizontal line interval. Accordingly, capacitor 50 contains a larger charge which can sustain conduction in transistor 22 for a somewhat longer interval after transistor 22 turns on at point $c$ than was the case when transistor 22 began conduction at point $a$. The magnetizing current in primary winding 26 will, therefore, be larger than before, at any given point in the discharge, since a larger mean voltage has been applied across the winding terminals for a longer time. As a result, transformer losses are increased, and the conditions for maintaining conduction in the transistor fail to be met at a slightly earlier point in the discharge than they were previously. In other words, capacitor 50 is unable to discharge to as low a voltage as it had in the previous cycle. The larger remanent charge in capacitor 50 corresponds to the voltage increment $V_2$.

Oscillator 16, with the assumed modifications, now begins a new cycle as capacitor 50 recharges and the sweep voltage traces upward from point $d$ to point $e$. This time, the trace hits the tip of the eleventh synchronizing pulse because it started from a somewhat higher voltage at point $d$ than at point $b$. Transistor 22 begins conduction at a lower level at point $e$ than at point $c$; capacitor 50 discharges through a shorter time interval than in its $c$-$d$ discharge interval; and the discharge of capacitor 50 ends at a lower voltage at point $f$ than at point $d$. The voltage at point $f$ is lower than the voltage at point $d$ by an amount $V_3$, which is approximately equal to $V_2$. On the next cycle, the sweep traces from point $f$ to point $g$ and strikes the twelfth synchronizing pulse. This action continues with the sweep wave alternately spanning either 11 or 12 pulses until some change takes place which can cause the oscillator to move out of the unstable region and lock onto a stable division ratio. However, before stability is realized the oscillator may pass through other modes of unstable operation in which, for example, it may add one horizontal line on every third or fourth cycle instead of on every other cycle.

In any of the unstable, transitional modes of prior art frequency-dividing systems, the sweep start voltages at points $b$, $d$, $f$ and other succeeding points jitter up and down as illustrated in FIG. 4. This, of course, causes the vertical starting point of each vertical sweep wave to be slightly changed and, therefore, causes a loss of interlace resolution.

In addition to these changes in sweep start voltage, unstable operation in the manner described in connection with FIG. 4 produces another undesirable picture effect. It is usual in television systems to couple the sweep generator output to the sweep yoke by means of an alternating-current coupling device. Each time that a line is added or dropped in the process of generating the vertical sweep wave, a change takes place in the average voltage of the sweep wave, i.e., in its direct-current component with respect to ground. The change in average voltage causes the entire picture to move up or down as the case may be by a fraction of a line width. This movement contributes further to the loss of accurate interlace.

Figure 5:
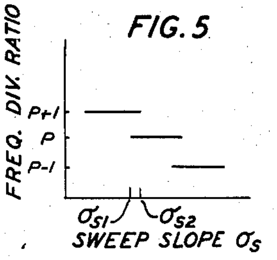

The beneficial memory characteristic of the invention avoids both the jitter in sweep start voltage and the picture movement in a manner which is graphically illustrated in FIG. 5. This figure is another diagram, showing frequency division ratios plotted against sweep slope $\sigma_s$. In this diagram, however, each of the steps at a particular frequency division ratio overlaps the steps above and below it by a small amount. Because of this overlap, the sweep slope at a frequency division ratio $p$ must decrease to a value $\sigma_{s1}$ before the division ratio can change to $p+1$. However, once the change has been made, no jitter is experienced because the slope must now increase to a value $\sigma_{s2}$, which is larger than $\sigma_{s1}$, before the division ratio can drop back to the value $p$ once more. If FIGS. 3 and 5 are compared it will be seen that in FIG. 3 the minimum slope $\sigma_{s1}$, at which a prior art circuit can operate with a stable division ratio $p$, is greater than the maximum slope $\sigma_{s2}$ at which such circuit can operate at a stable ratio $p+1$. This magnitude relationship of slopes is just the reverse of the relationship described in connection with FIG. 5.

Figure 6:
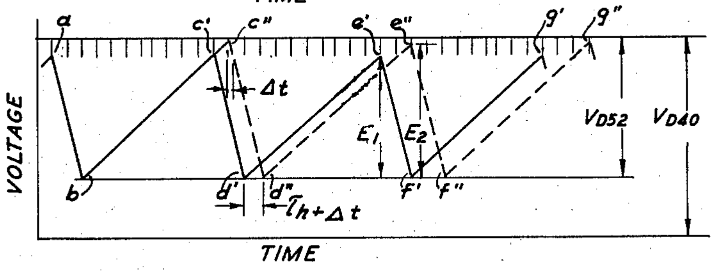

FIG. 6 is a voltage wave diagram which is similar to that of FIG. 4, but which illustrates the operation of the invention and shows the nature of beneficial memory and how it improves the picture display in video systems. In FIG. 6, wave diagram points which correspond to similar points in FIG. 4 are designated by similar reference characters.

All sweep trace portions in FIG. 6 start from the same floor voltage regardless of the number of synchronizing pulses spanned by the sweep wave. This characteristic was described in connection with FIG. 2 and is due to the cooperation of diodes 40, 52 and 53 in their described connections. The solid line diagram of FIG. 6 is included for the purpose of comparison and represents a sweep wave which operates continuously in the same fashion, just hitting the tips of the synchronizing pulses and spanning 11 synchronizing pulses in each cycle. The broken line diagram illustrates the operation of the invention when the eleventh synchronizing pulse is missed in the $b$–$c$ trace portion and the twelfth pulse triggers the oscillator into conduction. The retrace $c'$–$d'$ illustrates the normal retrace situation, and the retrace $c''$–$d''$ is the retrace in the broken line diagram. The latter retrace is terminated at point $d''$ which is at the same voltage level as the points $d'$ and $b$, but which is displaced to a later time represented by the horizontal line interval $\tau_h$ plus an incremental time $\Delta t$. The time $\Delta t$ represents the interval required at retrace slope $\sigma_r$ for the voltage to drop from the level at point $c''$ to the level of point $c'$ at tips of the synchronizing pulses.

Since the voltage for points $d'$ and $d''$ is the same, the effect of the incremental time $\Delta t$ is now realized and causes the trace starting at $d''$ definitely to miss the tip of the eleventh pulse after $c''$, and hence to be triggered by the twelfth pulse as in the preceding cycle. Thus, the oscillator continues to operate over a cycle span of 12 horizontal line pulses. This action was not possible in the illustration of FIG. 4 since the effect of the time increment $\Delta t$ was more than offset by the effect of the change of $V_2$ volts in the voltage level at which retrace was terminated. In accordance with the invention, the starting voltage with respect to ground of the trace portion of each sweep cycle is always substantially the same, and any factor which tends to cause the division ratio to change from one value to another produces only one change in the division ratio. As long as the original cause prevails, there is not jitter in sweep starting voltage, frequency ratio, or direct-current component to affect interlace resolution or the stability in position of the scanning lines.

The beneficial memory effect illustrated in FIGS 5 and 6 can also be demonstrated by determining the relationship which expresses the voltage E at which the trace portion of the sweep is terminated. First let subscripts 1 and 2 refer to the cases represented by the solid and dashed waves, respectively, of FIG. 6. For steady-state operation in each case the starting and ending voltages, i.e., the retrace-start and trace-end voltages, of each oscillation cycle, measured with respect to the floor voltage at which the trace portion of the wave begins, must be equal. The value E of this retrace-start (or trace-end) voltage may be expressed for each case in terms of the trace and retrace slopes and intervals as follows:

$$E_1 = -\tau_{r1}\sigma_r = \tau_{s1}\sigma_s \quad (1)$$

$$E_2 = -\tau_{r2}\sigma_r = \tau_{s2}\sigma_s \quad (2)$$

Also, the total period in each case must be equal to the sum of its component trace and retrace intervals and equal to the product of the horizontal line interval times the number of such intervals $p_m$ or $p_m+1$, respectively. These may be expressed as:

$$\tau_{r1} + \tau_{s1} = p_m\tau_h \quad (3)$$

$$\tau_{r2} + \tau_{s2} = (p_m+1)\tau_h \quad (4)$$

If the trace and retrace intervals are eliminated from Equations 1 and 3 or 2 and 4, there results an expression for the voltage E at the end of the trace which has the generalized form $$E = \frac{p\tau_h\sigma_s\sigma_r}{\sigma_s - \sigma_r} \quad (5)$$

If the slopes are related by $$b = \frac{-\sigma_r}{\sigma_s}$$

then Equation 5 becomes $$E = \frac{b}{b+1} p\tau_h\sigma_s \quad (6)$$

It has been observed that the tendency toward beneficial memory decreases as the ratio $b$ becomes large. The degree of beneficial memory in a particular circuit can be expressed by first solving Equation 6 for the trace slope $\sigma_s$. Then the resulting general slope expression is written for the specific trace slope $\sigma_{s1}$ which is the minimum trace slope for operation at the ratio $p_m$ (solid curve, FIG. 6), and for the specific trace slope $\sigma_{s2}$ which is the maximum slope at which the circuit can operate on the division ratio $p_m+1$ (dashed curve, FIG. 6). Now, by writing a further expression, which is the fractional difference between these two slopes $\sigma_{s1}$ and $\sigma_{s2}$, the following results:

$$\frac{\sigma_{s2}-\sigma_{s1}}{\sigma_{s1}}=\frac{1}{b(p_m+1)} \qquad (7)$$

The latter expression shows that the fractional difference between these two slopes, i.e., the tendency toward beneficial memory, varies inversely with the ratio $b$ of the retrace and trace slopes. As $b$ increases toward very large values, corresponding to $|\sigma_r|>>|\sigma_s|$, the beneficial memory decreases. On the other hand, for moderate values of $b$ the maximum slope $\sigma_{s2}$ at which the circuit can maintain a frequency-dividing ratio $p_m+1$ is significantly larger than the minimum slope $\sigma_{s1}$ at which the ratio $p_m$ can be maintained. Accordingly, if some factor produces a certain slope change that results in a change in the frequency division ratio, a larger reverse change in slope is required to restore the original ratio. In the circuit of FIG. 2 the resistance of resistor 27 may be selected to provide a desired retrace slope and a corresponding amount of beneficial memory.

Although this invention has been described in connection with a particular application thereof, it is to be understood that other applications and modifications which will be obvious to those skilled in the art are included within the spirit and scope of the invention.

What is claimed is:

1. In a sweep control system for an electron beam device adapted to scan a rectangular area, means generating signals for causing the repetitive sweep of the electron beam across the width of said area, a single-stage, triggered, blocking oscillator circuit producing a triangular output wave at a frequency which is much lower than the frequency of said signals, means applying said signals to trigger said oscillator, means applying said wave to said device for repetitively sweeping said electron beam through the length of said area, and a reverse breakdown diode connected in the feedback circuit of said oscillator for terminating oscillation at a predetermined feedback voltage level.

2. In a sweep control system for an electron beam device adapted to scan a rectangular area, means recurrently sweeping said beam along a first dimension of said area, a blocking oscillator comprising a transistor, a feedback transformer coupling an output electrode of said transistor to an input electrode thereof, means coupled to said input electrode through a winding of said transformer and biasing said transistor nonconducting in the absence of input signals in excess of a predetermined level, a reverse breakdown diode connected across said winding and poled for reverse conduction in response to the regenerative buildup of voltages in such winding to simulate saturation in said transformer upon the attainment at said input electrode of a predetermined voltage with respect to the voltage of said bias means, means coupling said output electrode to said device for causing the recurrent sweep of said beam across a second dimension of said area at a lower frequency, and non-oscillatory means responsive to the first-mentioned sweeping means applying conducting bias to said input electrode at the frequency of the sweep along said first dimension.

3. In a video system a circuit for generating synchronized signals to control line sweep and field sweep of an electron beam for interlaced scanning, said field sweep signals having a triangular waveform with sweep trace and retrace portions, said circuit comprising an oscillatory circuit producing recurrent line sweep control signals, a transistor having base, emitter, and collector electrodes, a transformer having primary and secondary windings, a capacitor connected in series with said primary winding between said collector and emitter electrodes, a source of current connected in a separate series circuit with said primary winding between said emitter and collector electrodes, said source supplying operating current to said transistor and charging current to said capacitor, two reverse breakdown diodes connected in series between said base electrode and a terminal of said capacitor remote from said emitter electrode, said diodes being poled for reverse conduction in opposite directions and having different reverse breakdown voltages, the difference between said breakdown voltages being equal to the starting voltage of said trace portion of the field sweep control signal, means connecting said secondary winding across the one of said diodes closest to said base electrode, said secondary winding being arranged for regenerative feedback from said collector electrode to said base electrode to the limit of the reverse breakdown voltage of said one diode on the regenerative buildup of each cycle of oscillation, a connection including the other one of said diodes as well as said secondary winding and said current source normally applying nonconducting bias to said base electrode, and means applying said line sweep control signals to said base electrode for triggering said transistor to produce said field sweep signals at one terminal of said capacitor.

4. In a video system, means generating picture line frequency and picture field frequency signals in synchronism and comprising a blocking oscillator generating a saw-tooth oscillation at said field frequency, said oscillator comprising a transistor having three electrodes, means supplying operating current to two of said electrodes, a capacitor connected to be charged by said supply means, a regenerative feedback transformer comprising a primary winding connected in series with said two electrodes and said supply means and a secondary winding connected to a third electrode of said transistor, bias means connected to said third electrode and normally biasing said transistor nonconducting, and a reverse breakdown diode connected between the terminals of said secondary winding, said diode being poled for reverse conduction in response to the regenerative buildup of feedback voltage tending to bias said transistor for conduction, means generating line frequency pulses, and means applying said line frequency pulses to said third electrode with a polarity tending to bias said transistor for conduction but with a peak magnitude such that they are unable alone to bias said transistor for conduction until the charge on said capacitor has attained a predetermined amplitude range.

5. In a video system, a frequency-dividing circuit comprising a triggered, single-stage, blocking oscillator having a regenerative feedback circuit, means applying signals at the line frequency of said system to an input of said oscillator, an output circuit for said oscillator at which are produced signals at the field frequency of said system, a terminal at a fixed reference voltage, means fixing the initial voltage with respect to said terminal of the trace portion of said field frequency signals, said means comprising a nonlinear conduction device limiting the maximum voltage in said feedback circuit.

6. In a system for generating sweep control signals for a cathode ray device, means generating line sweep signals of reversible phase, a blocking oscillator having transformer coupled regenerative feedback means with a primary transformer winding connected in the output of said oscillator and a secondary transformer winding connected in the input of said oscillator, a resistor coupling said sweep signals to the input of said oscillator, the resistance of said resistor being such that it co-operates with said secondary winding to differentiate said sweep signals, a reverse breakdown diode connected across said secondary winding and poled for reverse breakdown upon the attainment of a predetermined voltage level in said secondary winding during the regenerative buildup of oscillations, a capacitor connected in the output of said oscillator to be discharged through said oscillator during conduction intervals thereof, and means supplying operating current to said oscillator and charging current to said capacitor.

7. Means generating sweep control signals for a television system, said generating means comprising an oscillator generating line sweep control signals at the line frequency of the display in said system, a single-stage, frequency-dividing oscillator receiving said signals at said line frequency and producing control signals at the field frequency of said display, said frequency-dividing oscillator comprising a blocking oscillator having a transformer regeneratively coupling feedback between the output and input circuits of the blocking oscillator, a reverse breakdown diode connected across one winding of said transformer, said diode being poled to conduct in the reverse direction in response to the regenerative buildup of oscillations, means applying nonconducting bias to said oscillator through said one winding for biasing said oscillator nonconducting in the absence of input signals of a predetermined magnitude, an electron beam device, and means coupling said line frequency signals and said field frequency signals to sweep the beam of said device in accordance with a predetermined pattern.

8. In a control system, an oscillator for generating a triangular control wave at a first frequency in response to an input synchronizing wave of a second and much higher frequency having a period $\tau_h$, said control wave having a trace portion of a first predetermined slope $\sigma_s$ and a retrace portion of a second predetermined slope $\sigma_r$, said oscillator comprising a triode transistor, a transformer having a primary winding connected in series with a transistor electrode in the output of said oscillator and a secondary winding connected in series with a transistor electrode in the input of said transistor, means applying operating current to said transistor, a capacitor connected to a third electrode of said transistor to be charged from said operating current applying means and to be discharged through said transistor and transformer primary during conduction intervals of said oscillator, a resistor connected in series with said primary winding in the discharge circuit of said capacitor, the resistance of said resistor being such as to fix said slope $\sigma_r$ so that for a given ratio $b$ of the magnitudes of said slopes $\sigma_r$ and $\sigma_s$ and for a given ratio $p$ of said frequencies the voltage at which the trace portion of said control wave ends and the retrace portion begins is given by the relation $$E=\frac{b}{b+1}p\tau_h\sigma_s$$

and the tendency of said oscillator to constinue operating at a given frequency ratio $p$ is given by the relation $$\frac{\sigma_{s2}-\sigma_{s1}}{\sigma_{s1}}=\frac{1}{b(p+1)}$$

wherein $\sigma_{s1}$ is the minimum value of $\sigma_s$ at which said oscillator can operate with a frequency division ratio $p$ without changing to a larger ratio $p+1$, and $\sigma_{s2}$ is the maximum value of $\sigma_s$ at which said oscillator can operate at the higher ratio $p+1$ without changing to the ratio $p$.

9. In a sweep control circuit for a television system, means producing oscillations at a first frequency, an oscillatory circuit for producing a triangular output wave at a second frequency which is a function of said first frequency and of the slope of one portion of said wave, means applying said oscillations to said oscillatory circuit for synchronizing the production of said wave with said oscillations, and means in said oscillator controlling the starting voltage of said one portion so that the minimum value of said slope for operation at a ratio $p$ of said first frequency to said second frequency is less than the maximum value of said slope for operation at a ratio $p+1$ of said frequencies.

10. In a sweep control circuit for an electron beam in a television system, means providing oscillations at a first frequency, a single-stage oscillator comprising a transistor having at least three electrodes, a feedback transformer having two windings connected respectively to two of said electrodes for regeneratively coupling the output of said oscillator to the input thereof, means supplying operating current to said transistor, a capictor connected to a third electrode of said transistor and arranged to be charged by said supplying means and discharged through said transistor, a first reverse breakdown diode connected to one of said two windings to prevent saturated conduction in said transistor, and a second reverse breakdown diode connected to the other of said two windings to prevent saturation in said transformer, and means applying said oscillations and the voltage across said capacitor to control co-ordinate sweeping of said electron beam.

References Cited in the file of this patent

UNITED STATES PATENTS 3,033,996 Atherton ............... May 8, 1962

FOREIGN PATENTS 823,315 Great Britain ............ Nov. 11, 1959